US010409528B2

(12) United States Patent
Sun et al.

(10) Patent No.: US 10,409,528 B2
(45) Date of Patent: Sep. 10, 2019

(54) PRINTING SYSTEM THAT PERFORMS EASILY PRINTING OF UNPRINTED PAGES WHEN PRINTING IS INTERRUPTED, AND PRINTING METHOD

(71) Applicant: Kyocera Document Solutions Inc., Osaka (JP)

(72) Inventors: Zhenyu Sun, Osaka (JP); Masafumi Sato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/980,734

(22) Filed: May 15, 2018

(65) Prior Publication Data

US 2018/0341437 A1 Nov. 29, 2018

(30) Foreign Application Priority Data

May 29, 2017 (JP) ................................. 2017-105490

(51) Int. Cl.
*G06F 3/12* (2006.01)
(52) U.S. Cl.
CPC ............ *G06F 3/1206* (2013.01); *G06F 3/121* (2013.01); *G06F 3/1234* (2013.01); *G06F 3/1243* (2013.01); *G06F 3/1256* (2013.01); *G06F 3/1285* (2013.01); *G06F 3/1298* (2013.01)
(58) Field of Classification Search
None
See application file for complete search history.

(56) References Cited

U.S. PATENT DOCUMENTS

| 2005/0275867 A1* | 12/2005 | Higashiura | G06K 15/00 358/1.14 |
| 2010/0195144 A1* | 8/2010 | Kawai | G06F 3/1222 358/1.15 |
| 2010/0296827 A1* | 11/2010 | Miyahara | G03G 21/02 399/50 |
| 2012/0192264 A1* | 7/2012 | Sugiyama | G03G 15/5091 726/16 |

FOREIGN PATENT DOCUMENTS

| JP | 2003-108342 A | 4/2003 |
| JP | 2004-005748 A | 1/2004 |

\* cited by examiner

*Primary Examiner* — Thomas D Lee
(74) *Attorney, Agent, or Firm* — James Judge

(57) ABSTRACT

A printing system includes a data processing device and an image forming apparatus. The data processing device includes a data managing unit, a data transmitting unit, and a partial-data generating unit. The image forming apparatus includes a data reporting unit and a data request unit. The data reporting unit reports interrupted print data as the print data for which the image forming apparatus has terminated performance of a printing at a page in a middle. The partial-data generating unit generates unprinted-page print data as the partial-page print data, the unprinted-page print data being the print data of the pages the printing of which has been un-performed by the image forming apparatus in the interrupted print data. The data transmitting unit transmits the unprinted-page print data generated by the partial-data generating unit to the image forming apparatus when the interrupted print data is requested from the image forming apparatus.

3 Claims, 16 Drawing Sheets

PRINTING SYSTEM THAT PERFORMS EASILY PRINTING OF UNPRINTED PAGES WHEN PRINTING IS INTERRUPTED, AND PRINTING METHOD

INCORPORATION BY REFERENCE

This application is based upon, and claims the benefit of priority from, corresponding Japanese Patent Application No. 2017-105490 filed in the Japan Patent Office on May 29, 2017, the entire contents of which are incorporated herein by reference.

BACKGROUND

Unless otherwise indicated herein, the description in this section is not prior art to the claims in this application and is not admitted to be prior art by inclusion in this section.

There is known a typical printing system that transmits print data of a part of pages, which are divided corresponding to a specific rule or user's designation from print data of a plurality of pages, to an image forming apparatus. There is also known a printing system that transmits print data, for a part of pages designated by a user in print data of a plurality of pages, to an image forming apparatus.

SUMMARY

A printing system according to one aspect of the disclosure includes a data processing device and an image forming apparatus. The data processing device processes print data. The image forming apparatus performs a printing based on the print data. The data processing device includes a data managing unit, a data transmitting unit, and a partial-data generating unit. The data managing unit manages print data. The data transmitting unit transmits print data requested from the image forming apparatus, in the print data managed by the data managing unit, to the image forming apparatus. The partial-data generating unit generates partial-page print data as print data of only a part of pages from print data of a plurality of pages. The image forming apparatus includes a data reporting unit and a data request unit. The data reporting unit reports the print data managed by the data processing device. The data request unit requests the data processing device for indicated print data, in the print data reported by the data reporting unit. The data reporting unit reports interrupted print data as the print data for which the image forming apparatus has terminated performance of a printing at a page in a middle. The partial-data generating unit generates unprinted-page print data as the partial-page print data, the unprinted-page print data being the print data of the pages the printing of which has been un-performed by the image forming apparatus in the interrupted print data. The data transmitting unit transmits the unprinted-page print data generated by the partial-data generating unit to the image forming apparatus when the interrupted print data is requested from the image forming apparatus.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
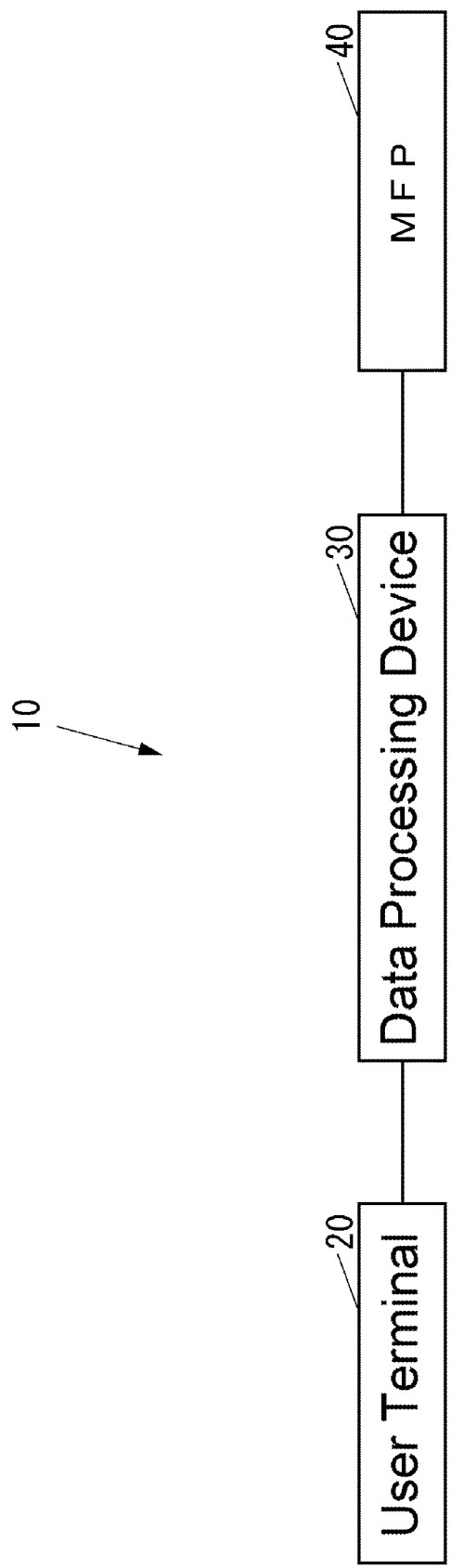
FIG. 1 shows a block diagram illustrating a printing system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the accompanying drawings.

First, a description will be given of a configuration of a printing system according to the embodiment.

FIG. 1 shows the block diagram illustrating the printing system 10 according to the embodiment.

As illustrated in FIG. 1, the printing system 10 includes: a user terminal 20 that transmits print data described in page description language such as printer control language (PCL);

a data processing device 30 that processes the print data transmitted by the user terminal 20; and a multifunction peripheral (MFP) 40 as an image forming apparatus that performs a printing based on the print data processed by the data processing device 30.

The user terminal 20 and the data processing device 30 are communicable with one another via a network such as the Internet or a local area network (LAN). Similarly, the data processing device 30 and the MFP 40 are communicable with one another via the network such as the Internet or the LAN.

The printing system 10 can include at least one user terminal that has a configuration similar to the user terminal 20 besides the user terminal 20. Similarly, the printing system 10 can include at least one MFP that has a configuration similar to the MFP 40 besides the MFP 40.

Figure 2:
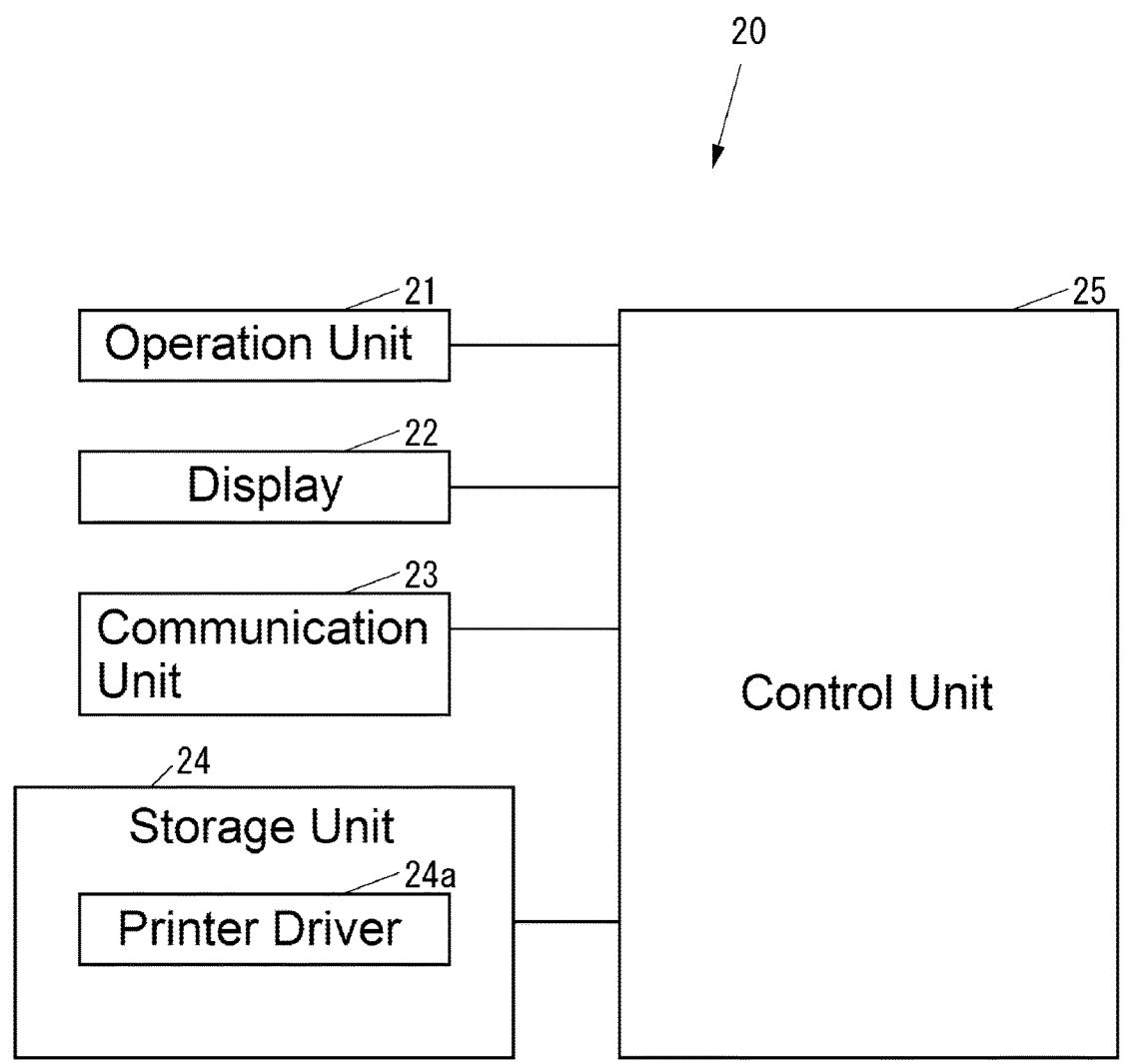
FIG. 2 shows a block diagram illustrating a user terminal according to the one embodiment.

FIG. 2 shows the block diagram illustrating the user terminal 20.

As illustrated in FIG. 2, the user terminal 20 includes: an operation unit 21 that is an input device such as a button, a keyboard, or a computer mouse with which various kinds of operations are entered; a display 22 that is a display device such as a liquid crystal display (LCD) that displays various kinds of information; a communication unit 23 that is a communication device that communicates with an external device via the network, or directly by wired or wireless communications without via the network; a storage unit 24 that is a non-volatile storage device such as a semiconductor memory or a hard disk drive (HDD) that stores various kinds of information; and a control unit 25 that controls the whole user terminal 20. The user terminal 20 is a computer such as a smart phone, a tablet, or a personal computer (PC).

The storage unit 24 stores a printer driver 24a to transmit the print data to the data processing device 30 (see FIG. 1). The printer driver 24a may be installed into the user terminal 20 at production stage of the user terminal 20, may be additionally installed into the user terminal 20 from an external storage medium such as a compact disk (CD), a digital versatile disk (DVD), a universal serial bus (USB) memory, or may be additionally installed into the user terminal 20 from the network.

The control unit 25 includes, for example, a central processing unit (CPU); a read-only memory (ROM) that stores programs and various kinds of data, and a random-access memory (RAM) that is used as a work area of the CPU. The CPU executes the programs stored in the ROM or the storage unit 24.

Figure 3:
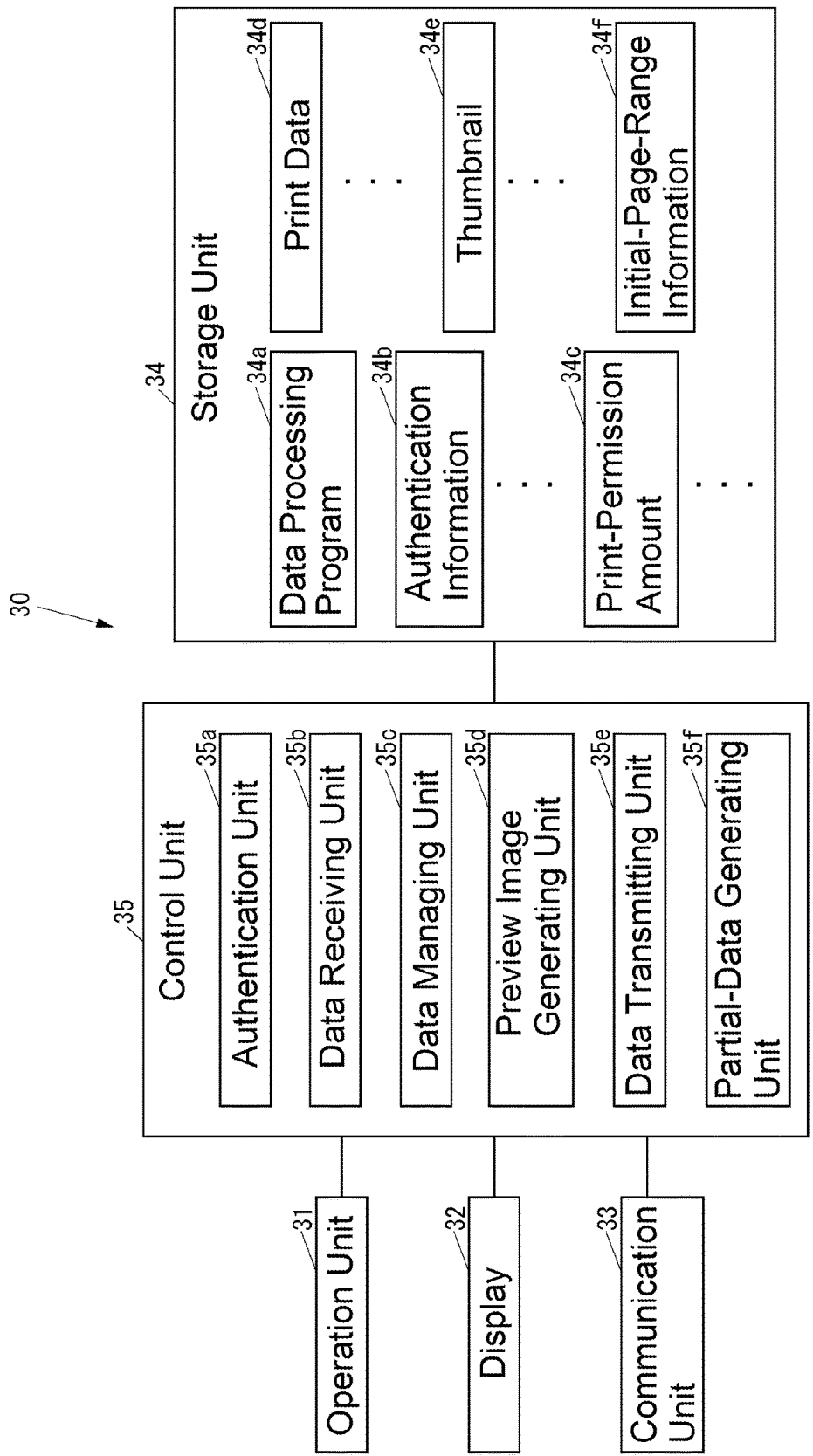
FIG. 3 shows a block diagram illustrating a data processing device according to the one embodiment.

FIG. 3 shoes the block diagram illustrating the data processing device 30.

As illustrated in FIG. 3, the data processing device 30 includes: an operation unit 31 that is an input device such as a keyboard or a computer mouse with which various kinds of operations are entered; a display 32 that is a display device such as an LCD that displays various kinds of information; a communication unit 33 that is a communication device that communicates with an external device via the network, or directly by wired or wireless communications without via the network; a storage unit 34 that is a non-volatile storage device such as a semiconductor memory or an HDD that stores various kinds of information; and a control unit 35 that controls the whole data processing device 30. The data processing device 30 is a computer such as a PC.

The storage unit 34 stores a data processing program 34a to process the print data. The data processing program 34a may be installed into the data processing device 30 at production stage of the data processing device 30, may be additionally installed into the data processing device 30 from an external storage medium such as a USB memory, a CD, or a DVD, or may be additionally installed into the data processing device 30 from the network.

The storage unit 34 stores authentication information 34b to authenticate a user for each user. For example, the authentication information 34b is a combination of a user ID and a password of a user.

The storage unit 34 stores a print amount (hereinafter referred to as "a print-permission amount") 34c that is permitted to a user for each user. A value of the print-permission amount 34c is increasable corresponding to an instruction entered from an external computer such as the user terminal 20 (see FIG. 1) or the MFP 40 (see FIG. 1) via the communication unit 33.

The storage unit 34 is configured to store a plurality of pieces of print data 34d.

The storage unit 34 is configured to store a plurality of thumbnails 34e as a preview image.

The storage unit 34 stores initial-page-range information 34f that indicates an initial page range of the thumbnails 34e. The page range indicated in the initial-page-range information 34f is a range from a first page up to a specified page, such as the first page to a fifth page. The page range indicated in the initial-page-range information 34f is changeable corresponding to an instruction entered via the operation unit 31 or an instruction entered from an external computer such as the user terminal 20 or the MFP 40 via the communication unit 33.

The control unit 35 includes, for example, a CPU, a ROM that stores programs and various kinds of data, and a RAM that is used as a work area of the CPU. The CPU executes the programs stored in the ROM or the storage unit 34.

By executing the data processing program 34a, the control unit 35 ensures: an authentication unit 35a, which performs authentication of a user; a data receiving unit 35b, which receives the print data; a data managing unit 35c, which manages the print data received by the data receiving unit 35b; a preview image generating unit 35d, which generates a thumbnail based on the print data; a data transmitting unit 35e, which transmits the print data requested from the MFP 40 in the print data managed by the data managing unit 35c to the MFP 40; and a partial-data generating unit 35f, which generates partial-page print data as the print data of only a part of pages from the print data of a plurality of pages.

As an image format of the thumbnail generated by the preview image generating unit 35d, there exists, for example, Joint Photographic Experts Group (JPEG), Tagged Image File Format (TIFF), or similar format. The image format of the thumbnail generated by the preview image generating unit 35d is changeable corresponding to the instruction entered via the operation unit 31 or the instruction entered from the external computer such as the user terminal 20 or the MFP 40 via the communication unit 33.

Figure 4:
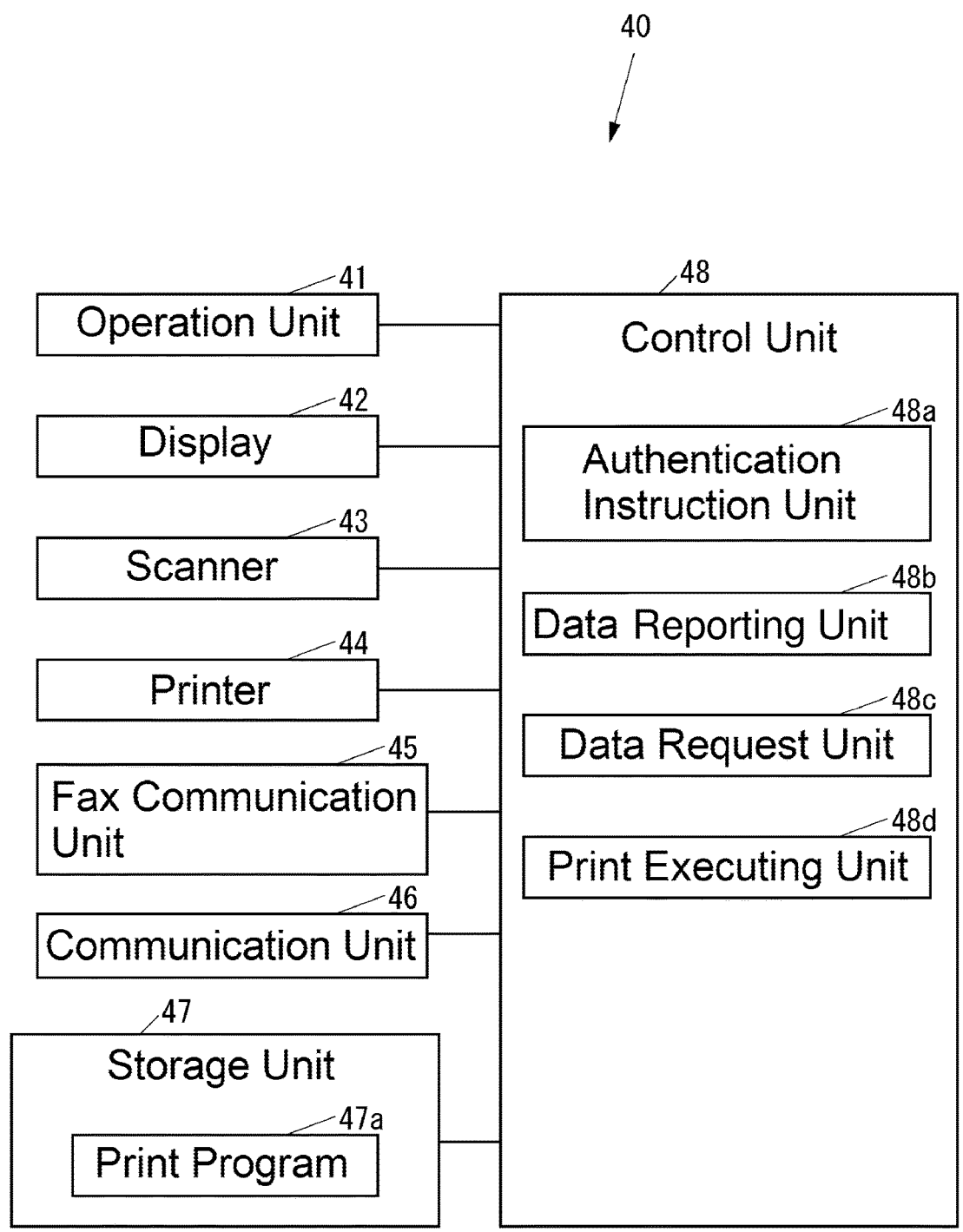
FIG. 4 shows a block diagram illustrating an MFP according to the one embodiment.

FIG. 4 shows the block diagram illustrating the MFP 40.

As illustrated in FIG. 4, the MFP 40 includes: an operation unit 41 that is an input device such as a button with which various kinds of operations are entered; a display 42 that is a display device such as an LCD that displays various kinds of information; a scanner 43 that is a reading device that reads an image from a document; a printer 44 that is a print device that prints an image to a recording medium such as a paper sheet; a fax communication unit 45 that is a fax device that performs fax communications with an external facsimile device (not illustrated) via a communication line such as a dial-up line; a communication unit 46 that is a communication device that communicate with an external device via the network or directly by wired or wireless communications without via the network; a storage unit 47 that is a non-volatile storage device such as a semiconductor memory or an HDD that stores various kinds of information; and a control unit 48 that controls the whole MFP 40.

The storage unit 47 stores a print program 47a to perform a printing based on the print data. The print program 47a may be installed into the MFP 40 at production stage of the MFP 40, may be additionally installed into the MFP 40 from an external storage medium such as a USB memory, or may be additionally installed into the MFP 40 from the network.

The control unit 48 includes, for example, a CPU, a ROM that stores programs and various kinds of data, and a RAM that is used as a work area of the CPU. The CPU executes the programs stored in the ROM or the storage unit 47.

By executing the print program 47a, the control unit 48 ensures: an authentication instruction unit 48a, which instructs the data processing device 30 (see FIG. 3) for authentication of a user; a data reporting unit 48b, which reports the print data managed by the data processing device 30; a data request unit 48c, which requests the data processing device 30 for indicated print data in the print data reported by the data reporting unit 48b; and a print executing unit 48d, which performs a printing by the printer 44 based on the print data.

Next, a description will be given of operations of the printing system 10.

First, a description will be given of the operations of the data processing device 30 when managing new print data.

A user can instruct the user terminal 20 to transmit the print data to the data processing device 30 via the operation unit 21 of the user terminal 20 by association it with identification information (hereinafter referred to as "a user ID") of the user. When being instructed to transmit the print data to the data processing device 30 by the association it with the user ID, the control unit 25 of the user terminal 20 executes the printer driver 24a to transmit the print data and the user ID associated with this print data, to the data processing device 30.

Figure 5:
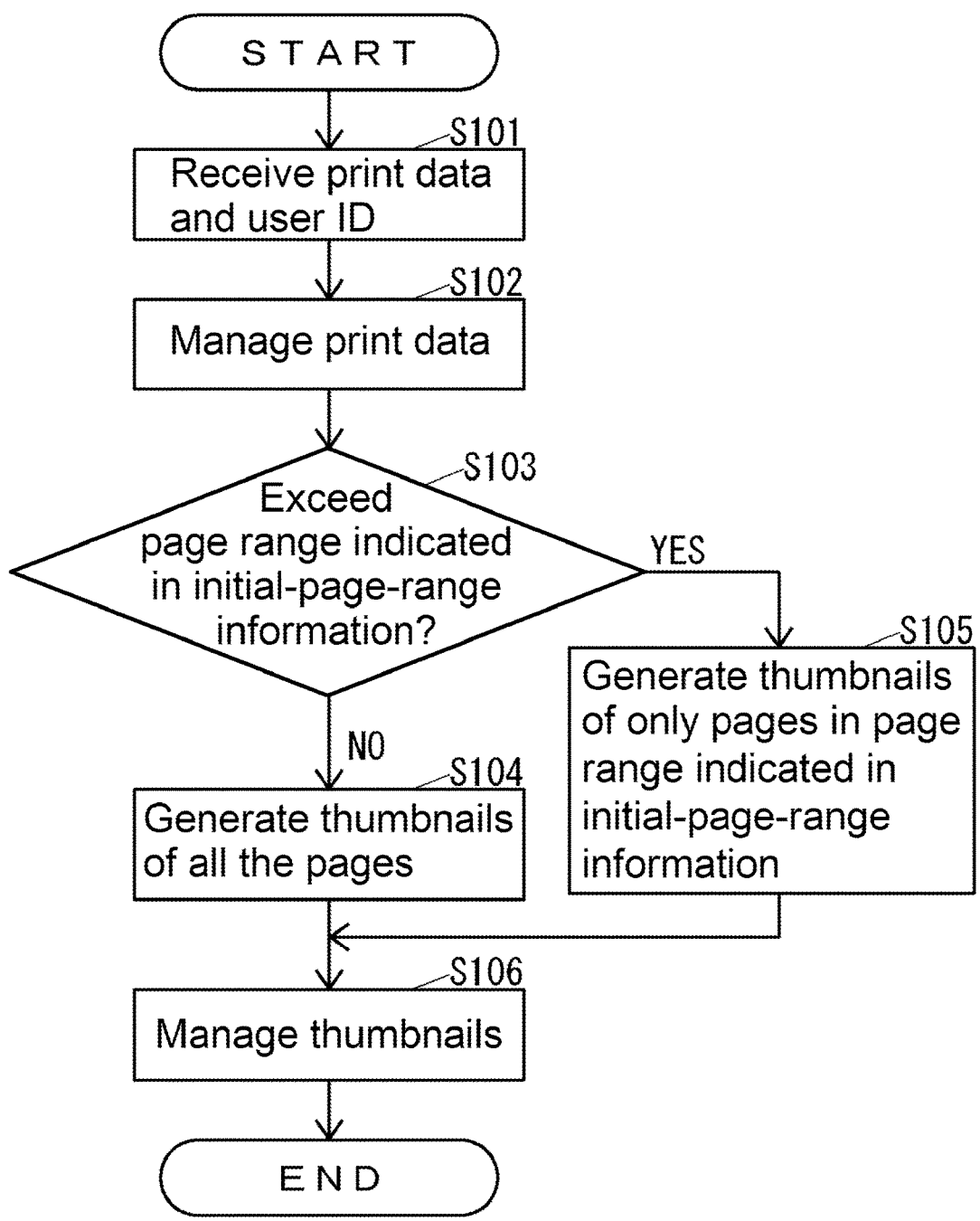
FIG. 5 shows a flowchart of operations of the data processing device according to the one embodiment when managing new print data.

Transmission of the print data and the user ID associated with this print data from the user terminal 20 causes the control unit 35 of the data processing device 30 to perform the operations illustrated in FIG. 5.

FIG. 5 shows the flowchart of the operations of the data processing device 30 when managing new print data.

As illustrated in FIG. 5, the data receiving unit 35b receives the print data transmitted from the user terminal 20 and the user ID associated with this print data (Step S101).

Subsequently, the data managing unit 35c sets the print data, which has been received at Step S101, as the print data 34d and manages by associating it with the user ID received at Step S101 and by storing into the storage unit 34 (Step S102).

Subsequently, the preview image generating unit 35d determines whether the pages included in the print data exceed a page range indicated in the initial-page-range information 34f or not (Step S103).

When determining that the pages included in the print data do not exceed the page range indicated in the initial-page-range information 34f at Step S103, the preview image generating unit 35d generates the thumbnails of all the pages included in the print data by executing a rendering of all the pages included in the print data (Step S104).

When determining that the pages included in the print data exceed the page range indicated in the initial-page-range information 34f at Step S103, the preview image generating unit 35d generates the thumbnails of only the pages in the page range indicated in the initial-page-range information 34f among the pages included in the print data by executing the rendering of only the pages in the page range indicated in the initial-page-range information 34f among the pages included in the print data (Step S105).

After the process at Step S104 or S105, the data managing unit 35c manages the thumbnails generated at Step S104 or S105 by storing into the storage unit 34 as the thumbnails 34e (Step S106). The data managing unit 35c manages the thumbnails 34e by associating with the print data 34d on which the thumbnails 34e are based.

After the process at Step S106, the control unit 35 terminates the operations illustrated in FIG. 5.

Next, a description will be given of the operations of the printing system 10 when the MFP 40 reports the print data managed by the data processing device 30.

Figure 6:
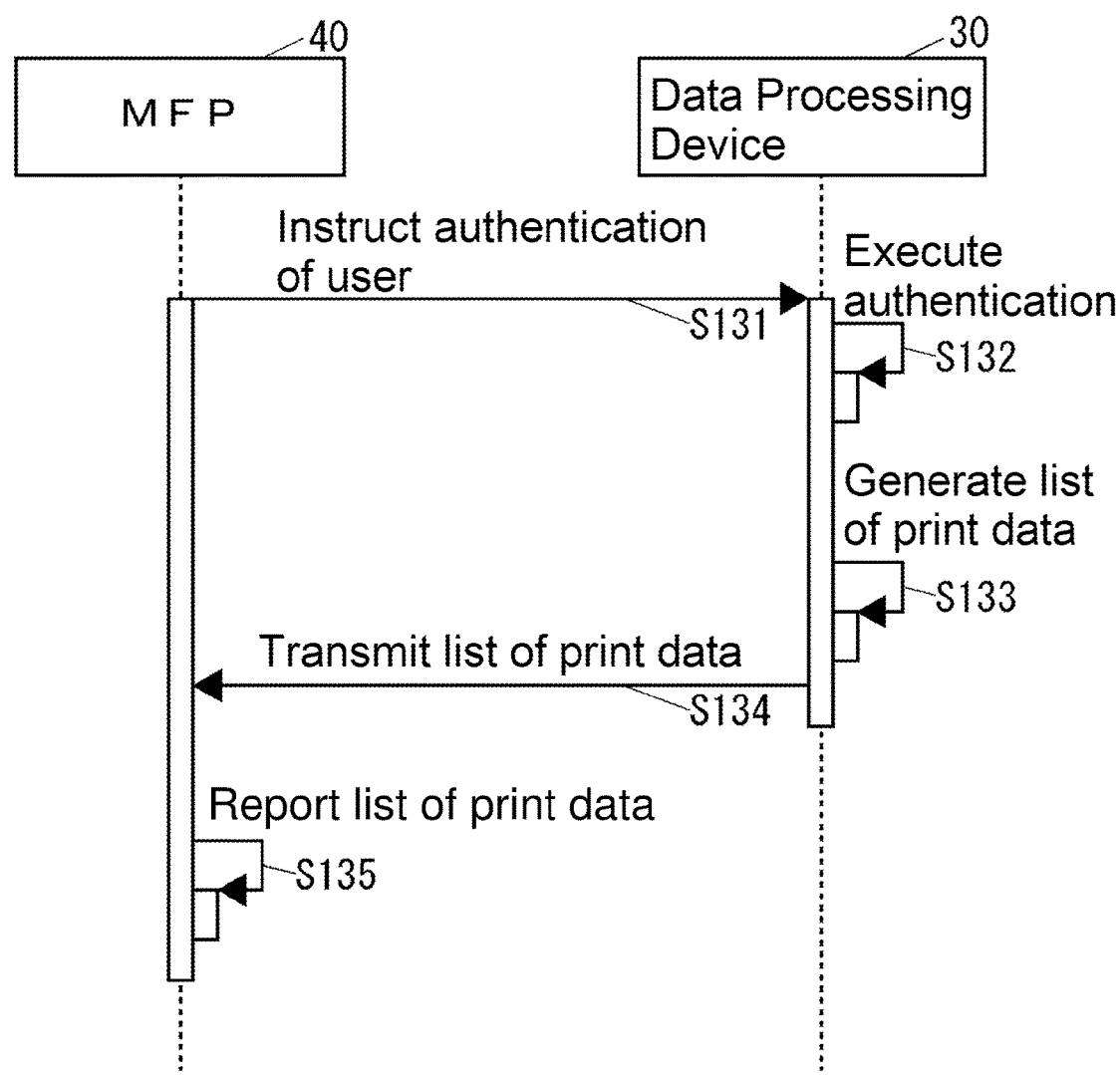
FIG. 6 shows a sequence diagram of operations of the printing system according to the one embodiment when the MFP reports the print data managed by the data processing device.

FIG. 6 shows the sequence diagram of the operations of the printing system 10 when the MFP 40 reports the print data managed by the data processing device 30.

The user can instruct the MFP 40 for a login to the MFP 40 by entering the authentication information such as a combination of the user ID and the password of the user via the operation unit 41 of the MFP 40.

When the login to the MFP 40 is instructed, as illustrated in FIG. 6, the authentication instruction unit 48a of the MFP 40 instructs the data processing device 30 for the authentication of the user by transmitting the authentication information entered via the operation unit 41, to the data processing device 30 (Step S131).

When the authentication of the user is instructed from the MFP 40, the authentication unit 35a of the data processing device 30 performs the authentication of the user based on the authentication information, which has been transmitted from the MFP 40, and the authentication information 34b stored in the storage unit 34 (Step S132).

When the authentication at step S132 succeeds, the data managing unit 35c generates a list of the print data 34d managed by associating it with the user ID of the user who has been authenticated at Step S132 (Step S133).

Subsequently, the data transmitting unit 35e transmits the list generated at Step S133 to the MFP 40 (Step S134).

When the list of the print data 34d is transmitted from the data processing device 30, the data reporting unit 48b of the MFP 40 reports the list of the print data 34d by displaying a list display screen 50 (see FIG. 7) that indicates the transmitted list on the display 42 (Step S135).

Figure 7:
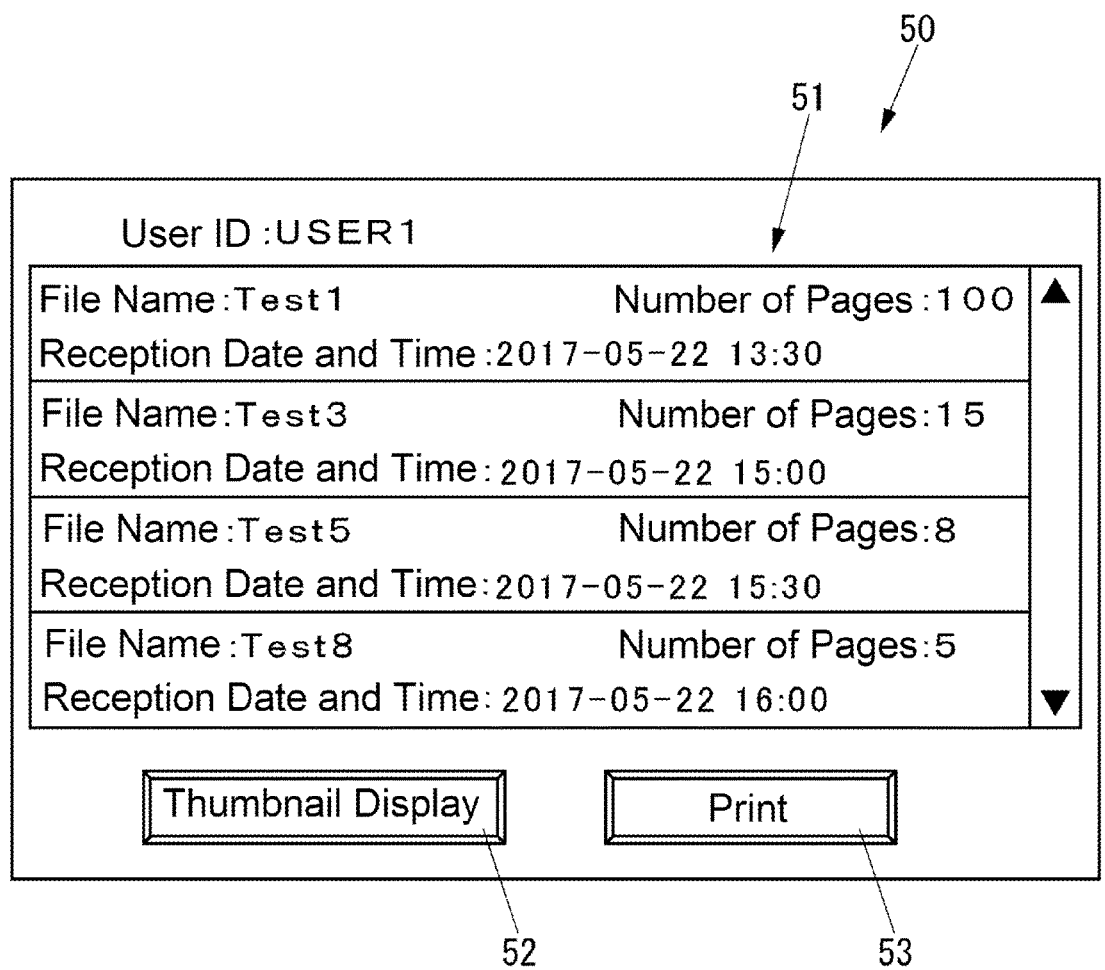
FIG. 7 shows an exemplary list display screen displayed in the operations illustrated in FIG. 6.

FIG. 7 shows one example of the list display screen 50.

As illustrated in FIG. 7, the list display screen 50 includes: a list 51 of the print data 34d managed by the data processing device 30 by association it with the user logging in the MFP 40; a thumbnail display button 52 for displaying the thumbnails of the print data 34d selected in the list 51; and a print button 53 for executing a printing based on the print data 34d selected in the list 51.

Next, a description will be given of the operations of the printing system 10 when the MFP 40 reports the print data 34d managed by the data processing device 30 by the thumbnails.

Figure 8:
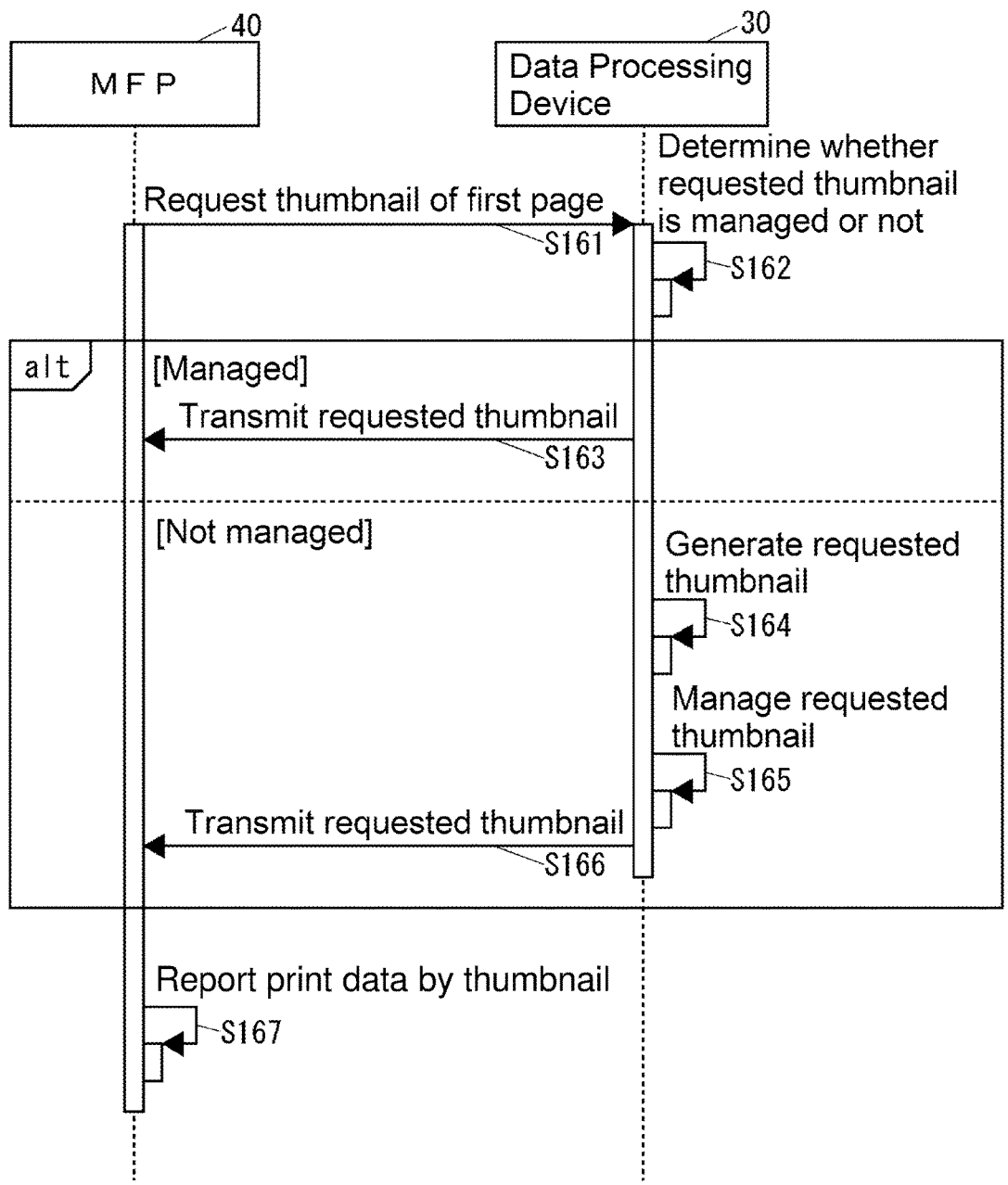
FIG. 8 shows a sequence diagram of the operations of the printing system according to the one embodiment when the MFP reports the print data managed by the data processing device by a thumbnail.

FIG. 8 shows the sequence diagram of the operations of the printing system 10 when the MFP 40 reports the print data 34d managed by the data processing device 30 by the thumbnails.

As illustrated in FIG. 8, when the thumbnail display button 52 on the list display screen 50 is pressed, the data reporting unit 48b of the MFP 40 requests the data processing device 30 for the thumbnail 34e of a first page of the print data 34d selected in the list 51 (Step S161).

Accordingly, the data managing unit 35c of the data processing device 30 determines whether the thumbnail 34e requested at Step S161 is managed or not (Step S162).

When it is determined that the thumbnail 34e requested at Step S161 is managed at Step S162, the data transmitting unit 35e transmits the thumbnail 34e to the MFP 40 (Step S163).

When it is determined that the thumbnail 34e requested at Step S161 is not managed at Step S162, the preview image generating unit 35d generates the thumbnail requested at Step S161 by performing the rendering of the first page of the print data 34d the thumbnail of which has been requested at Step S161 (Step S164).

After the process at Step S164, the data managing unit 35c manages the thumbnail generated at Step S164 by storing it into the storage unit 34 as the thumbnail 34e (Step S165). The data managing unit 35c manages the thumbnail 34e by associating with the print data 34d on which the thumbnail 34e is based.

Subsequently, the data transmitting unit 35e transmits the thumbnail 34e managed at Step S165 to the MFP 40 (Step S166).

When the thumbnail 34e is transmitted from the data processing device 30 at Step S163 or S166, the MFP 40 reports the print data 34d using the thumbnail 34e by displaying a thumbnail display screen 60 (see FIG. 9), which indicates the thumbnail 34e transmitted from the data processing device 30, on the display 42 (Step S167).

Figure 9:
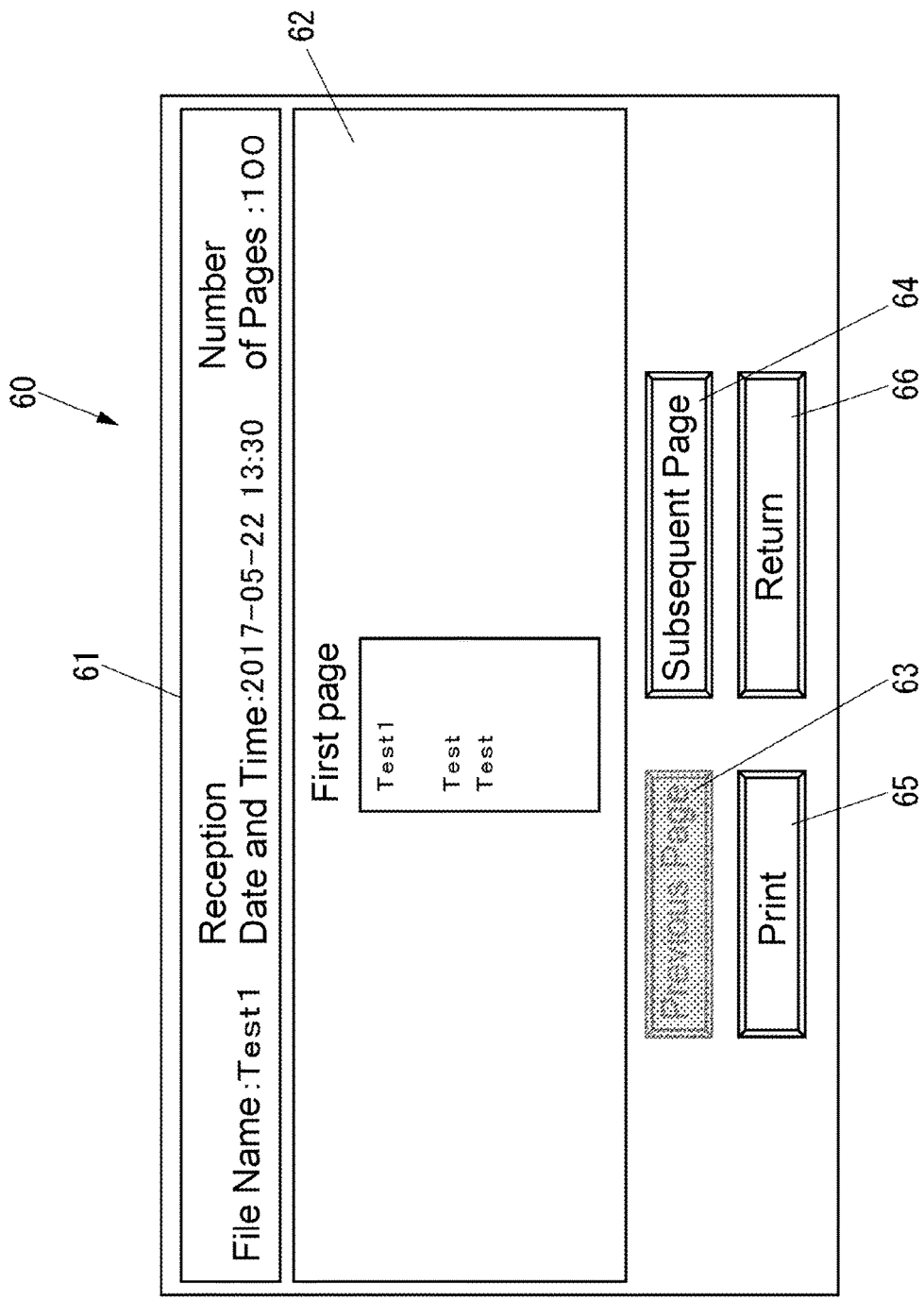
FIG. 9 shows an exemplary thumbnail display screen displayed in the operations illustrated in FIG. 8.

FIG. 9 shows one example of the thumbnail display screen 60.

As illustrated in FIG. 9, the thumbnail display screen 60 includes: a text 61, which indicates the identification information of the print data; a thumbnail display area 62 for displaying the thumbnail of the print data indicated in the text 61; a previous-page button 63 for displaying the thumbnail of the previous page of the page, which is displayed in the thumbnail display area 62; a subsequent-page button 64 for displaying the thumbnail of the subsequent page of the page, which is displayed in the thumbnail display area 62; a print button 65 for executing a printing based on the print data indicated in the text 61; and a return button 66 for returning to the list display screen 50. When the page displayed in the thumbnail display area 62 is the first page, the previous-page button 63 is grayed out and cannot be operated. When the page displayed in the thumbnail display area 62 is the last page of the print data, the thumbnail of which is displayed in the thumbnail display area 62, the subsequent-page button 64 grayed out and cannot be operated.

The operation of the previous-page button 63 or the subsequent-page button 64 causes the operations similar to Steps S161 to S167 to be performed to display the thumbnail of the corresponding page in the thumbnail display area 62.

While the thumbnail is displayed by one page on the thumbnail display screen 60 illustrated in FIG. 9, the thumbnails of a plurality of pages may be simultaneously displayed.

Subsequently, a description will be given of the operations of the printing system 10 when the MFP 40 performs a printing based on the print data.

Figure 10:
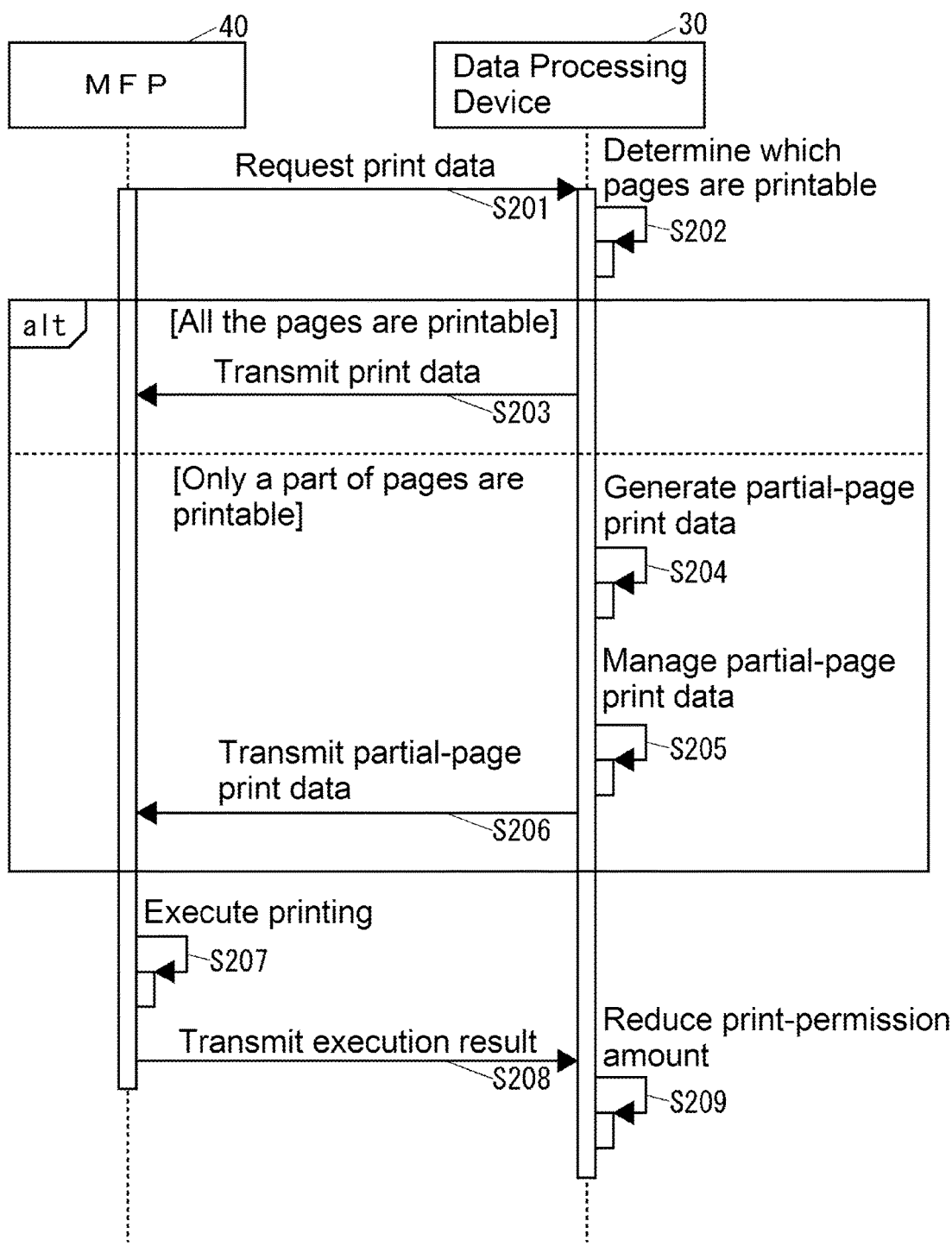
FIG. 10 shows a sequence diagram of the operations of the printing system according to the one embodiment when the MFP performs a printing based on the print data.

FIG. 10 shows the sequence diagram of the operations of the printing system 10 when the MFP 40 performs a printing based on the print data.

As illustrated in FIG. 10, when the print button 53 on the list display screen 50 or the print button 65 on the thumbnail display screen 60 is operated, the data request unit 48c of the MFP 40 requests the data processing device 30 for the print data 34d indicated in the list display screen 50 or the thumbnail display screen 60, namely, the print data 34d selected in the list 51 of the list display screen 50 or the print data 34d indicated in the text 61 of the thumbnail display screen 60 (Step S201).

When the print data 34d is requested from the MFP 40, the data transmitting unit 35e of the data processing device 30 determines which pages included in the print data 34d are printable by the MFP 40 based on the number of pages included in the print data 34d, which is requested from the MFP 40, and the print-permission amount 34c of the user logging in the MFP 40 (Step S202).

When determining that all the pages included in the print data 34d are printable by the MFP 40 at Step S202, the data transmitting unit 35e transmits the print data 34d that is managed by the data managing unit 35c and requested at Step S201 to the MFP 40 (Step S203).

When only a part of the pages included in the print data 34d are determined to be printable by the MFP 40 at Step S202, the partial-data generating unit 35f generates the print data of the pages that are printable by the MFP 40 among the pages included in the print data 34d, which are managed by the data managing unit 35c and requested at Step S201, namely only the pages in a range of the number of pages corresponding to the print-permission amount 34c from the first page, namely, the partial-page print data (Step S204).

Subsequently, the data managing unit 35c sets the partial-page print data, which has been generated at Step S204, as the print data 34d and manages it by storing into the storage unit 34 by associating it with the user ID that is associated with the print data 34d on which this partial-page print data is based (Step S205).

Subsequently, the data transmitting unit 35e transmits the partial-page print data managed at Step S205 to the MFP 40 (Step S206).

When determined that any page included in the print data 34d is unprintable by the MFP 40 at Step S202, the data transmitting unit 35e reports the MFP 40 of a fact that the print-permission amount 34c is insufficient. Accordingly, the data request unit 48c of the MFP 40 displays a fact that the print-permission amount 34c is insufficient on the display 42.

When the print data 34d is transmitted from the data processing device 30 at Step S203 or S206, the print executing unit 48d of the MFP 40 performs a printing by the printer 44 based on the transmitted print data 34d (Step S207). At Step S207, the print executing unit 48d performs the rendering of all the pages included in the print data 34d for printing by the printer 44.

After the process at Step S207, the print executing unit 48d transmits a performance result of the printing at Step S207 to the data processing device 30 (Step S208).

When the performance result of the printing is transmitted from the MFP 40, the data managing unit 35c of the data processing device 30 reduces the print-permission amount 34c of the user logging in the MFP 40 based on the transmitted performance result (Step S209).

In the operations illustrated in FIG. 10, when only a part of the pages included in the print data 34d are printable by the MFP 40, the partial-page print data as the print data of only the pages printable by the MFP 40, among the pages included in the print data 34d requested from the MFP 40, is transmitted to the MFP 40 from the data processing device 30 (Step S206). However, when the MFP 40 is configured to determine printable pages based on the print-permission amount 34c, the print data 34d requested from the MFP 40 may be directly transmitted to the MFP 40 from the data processing device 30.

When the performance result that indicates the performance of the printing based on the generated partial-page print data is transmitted from the MFP 40 after the partial-page print data has been generated at Step S204, the data managing unit 35c includes the interrupted print data as the print data 34d, for which the MFP 40 has terminated the performance of the printing at a page in the middle, in the list when generating a list at Step S133.

Figure 11:
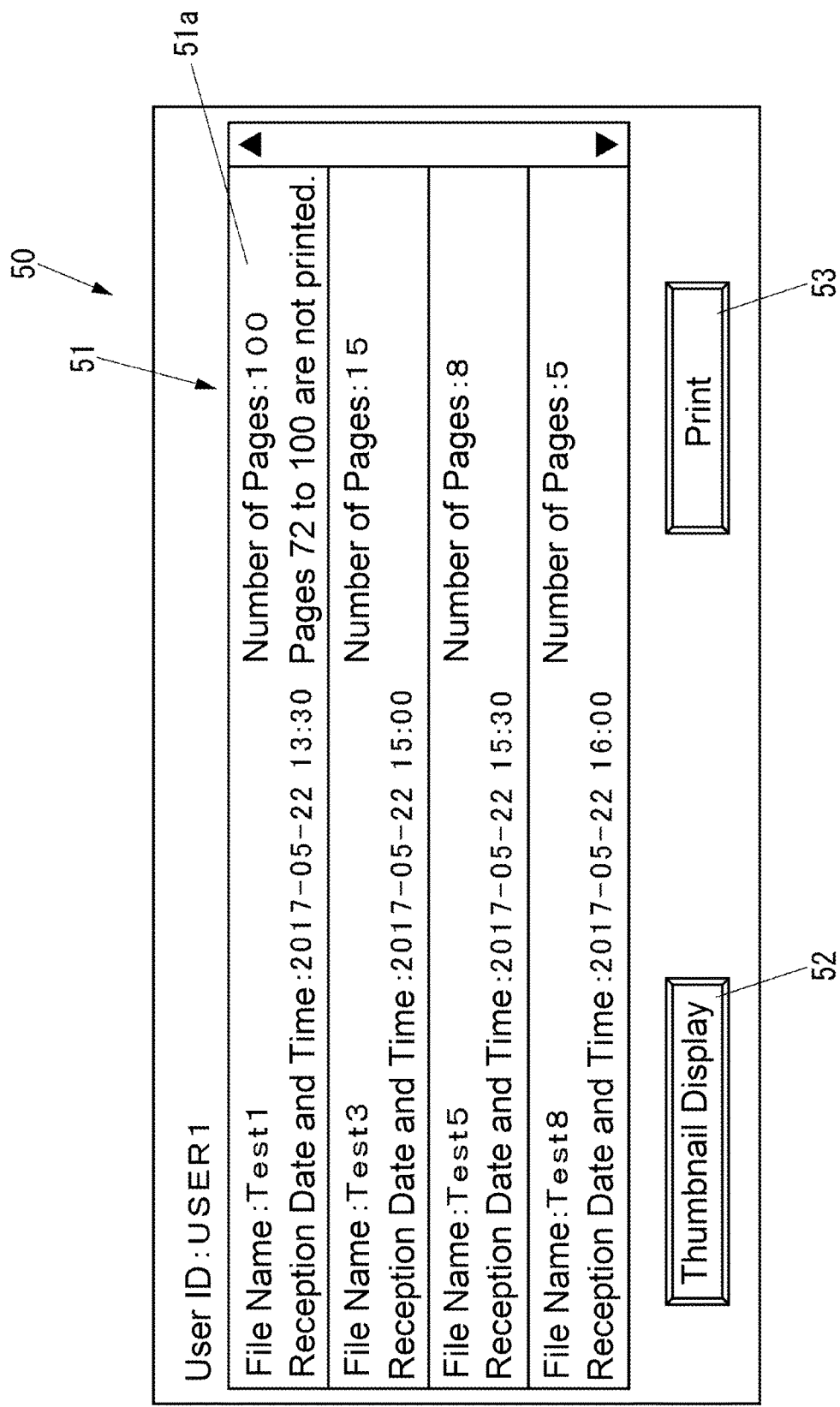
FIG. 11 shows an exemplary list display screen illustrated in FIG. 7 when illustrating interrupted print data.

FIG. 11 shows one example of the list display screen 50 when the interrupted print data is indicated.

The list 51 on the list display screen 50 illustrated in FIG. 11 includes interrupted print data 51a. The example illustrated in FIG. 11 indicates that the printing of page 72 to page 100 among the pages included in the interrupted print data 51a is not performed.

While only one piece of interrupted print data is described in FIG. 11, there is also a case where a plurality of pieces of interrupted print data are included in the list 51.

Next, a description will be given of the operations of the printing system 10 when the MFP 40 performs a printing based on the interrupted print data.

Figure 12:
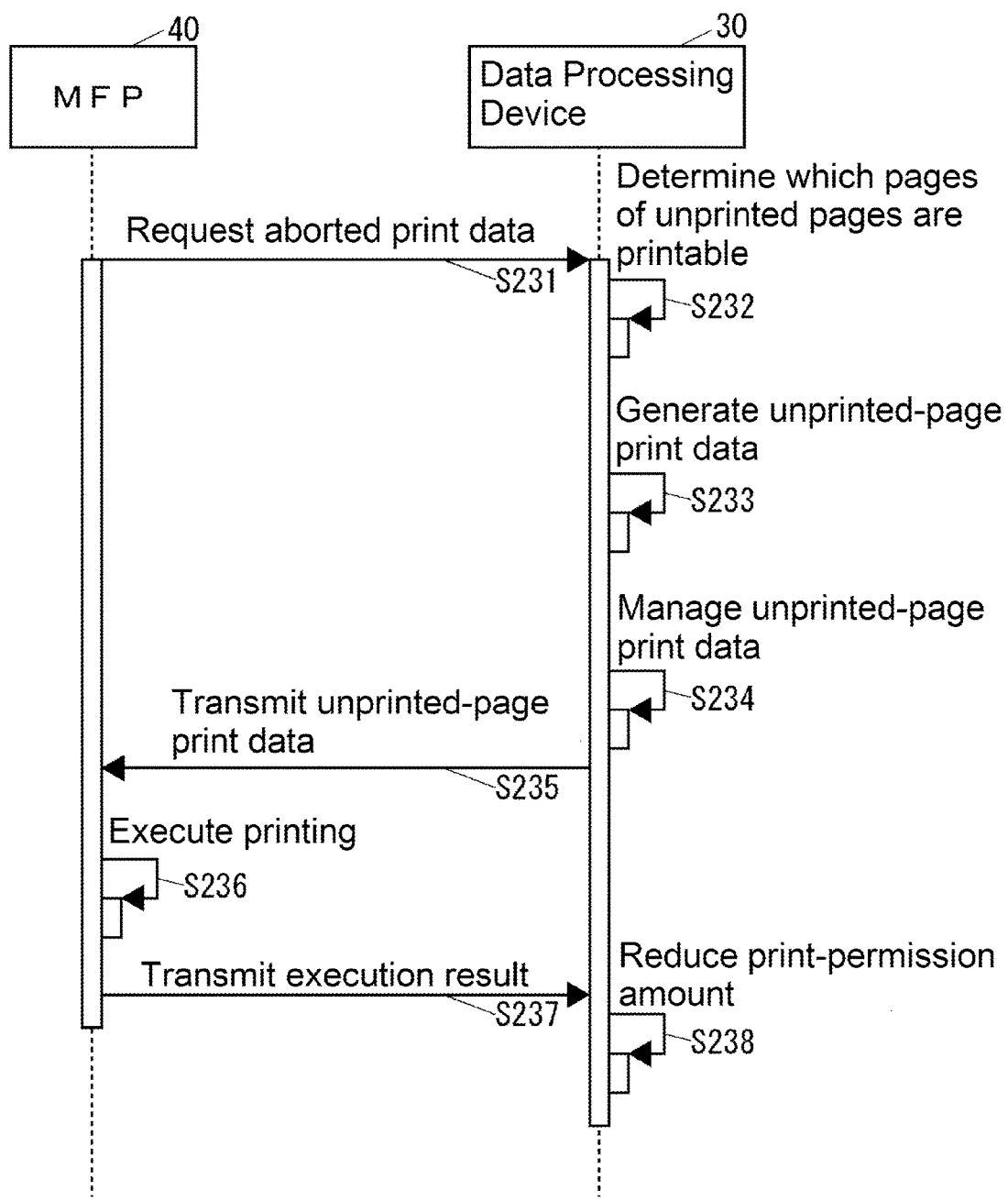
FIG. 12 shows a sequence diagram of the operations of the printing system according to the one embodiment when the MFP performs a printing based on the interrupted print data selected from the list display screen.

FIG. 12 shows the sequence diagram of the operations of the printing system 10 when the MFP 40 performs a printing based on the interrupted print data selected from the list display screen 50.

The user logging in the MFP 40 can increase the print-permission amount 34c. The user logging in the MFP 40 may log in the MFP 40 again after once logging out of the MFP 40 and increasing the print-permission amount 34c. When the print button 53 on the list display screen 50 or the print button 65 on the thumbnail display screen 60 is operated in a state where the interrupted print data is specified in the list display screen 50 or the thumbnail display screen 60, the data request unit 48c of the MFP 40 requests the data processing device 30 for the interrupted print data specified in the list display screen 50 or the thumbnail display screen 60, as illustrated in FIG. 12 (Step S231).

When the interrupted print data is requested from the MFP 40, the data transmitting unit 35e of the data processing device 30 determines which pages of these unprinted pages are printable by the MFP 40 based on: the number of pages of the page (hereinafter referred to as "an unprinted page") the printing of which has not been performed by the MFP 40, and the print-permission amount 34c of the user having logged in the MFP 40, among the pages included in the interrupted print data requested from the MFP 40 (Step S232).

When determined that all the pages of the unprinted pages in the interrupted print data are printable by the MFP 40 at Step S232, the partial-data generating unit 35f generates the print data of only the unprinted pages in the interrupted print data requested from the MFP 40, namely unprinted-page print data (Step S233).

Subsequently, the data managing unit 35c sets the unprinted-page print data generated at Step S233 as the print data 34d and manages it by storing into the storage unit 34 by associating with the user ID that is associated with the print data 34d on which the unprinted-page print data is based (Step S234).

Subsequently, the data transmitting unit 35e transmits the unprinted-page print data managed at Step S234 to the MFP 40 (Step S235).

When the unprinted-page print data is transmitted from the data processing device 30 at Step S235, the print executing unit 48d of the MFP 40 performs a printing by the printer 44 based on the transmitted unprinted-page print data (Step S236). The print executing unit 48d performs the rendering of all the pages included in the unprinted-page print data for printing by the printer 44 at Step S236.

After the process at Step S236, the print executing unit 48d transmits the performance result of the printing at Step S236 to the data processing device 30 (Step S237).

When the performance result of the printing is transmitted from the MFP 40, the data managing unit 35c of the data processing device 30 reduces the print-permission amount 34c of the user logging in the MFP 40 based on the transmitted performance result (Step S238).

The processes when it is determined at Step S232 that only a part of the pages among the unprinted pages in the interrupted print data are printable by the MFP 40 are identical to the processes when it is determined at Step S202 that only a part of the pages included in the print data 34d are printable by the MFP 40. The processes when is it determined at Step S232 that any page of the unprinted pages in the interrupted print data is impossible to print by the MFP 40 are identical to the processes when it is determined at Step S202 that any page included in the print data 34d is impossible to print by the MFP 40.

Figure 13:
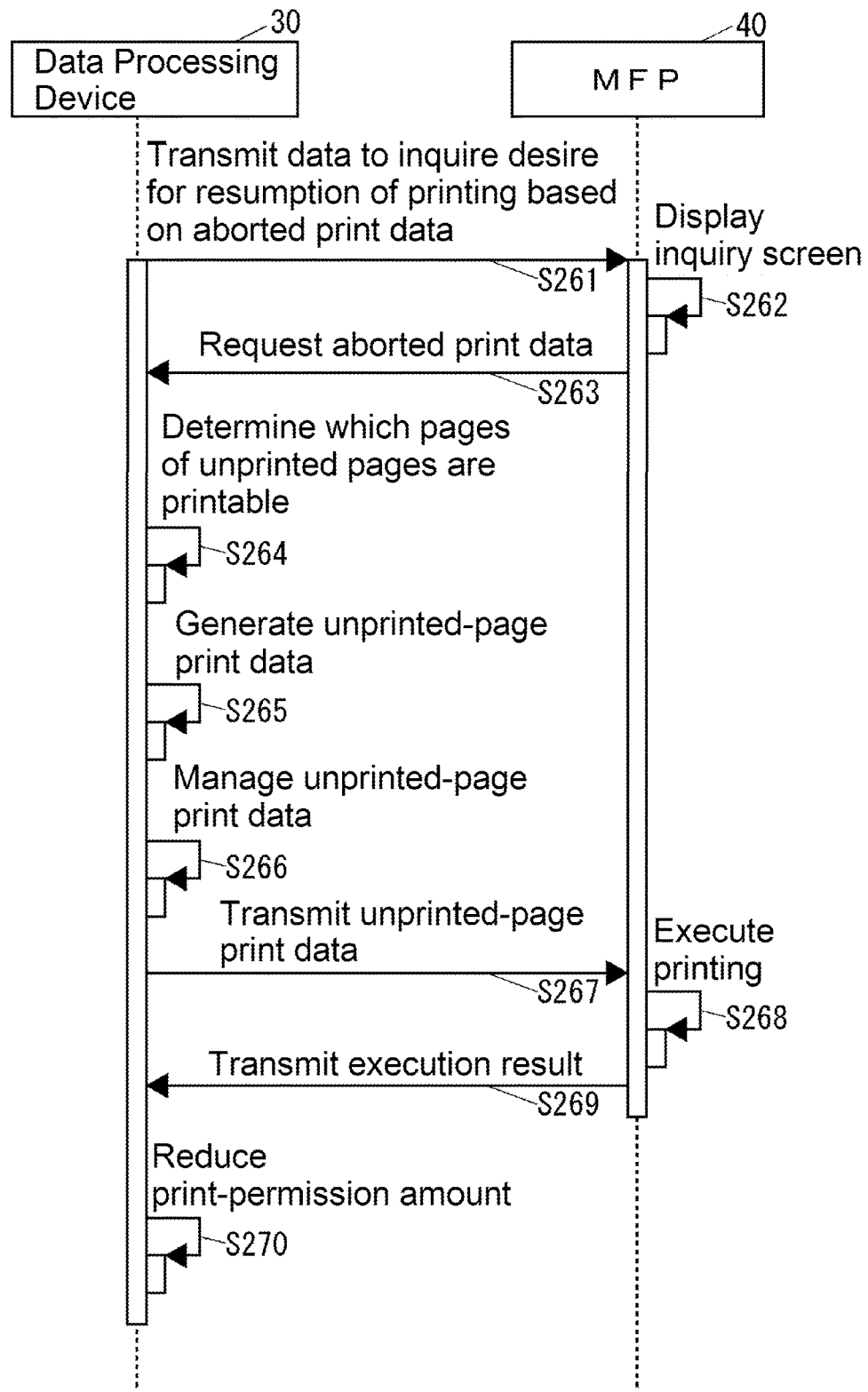
FIG. 13 shows a sequence diagram of the operations of the printing system according to the one embodiment when the MFP performs a printing based on the interrupted print data designated by the MFP.

For the operations of the printing system 10 when the MFP 40 performs the printing based on the interrupted print data, the operations illustrated in FIG. 13 may be performed, in addition to the operations illustrated in FIG. 12 or instead of the operations illustrated in FIG. 12.

FIG. 13 shows the sequence diagram of the operations of the printing system 10 when the MFP 40 performs the printing based on the interrupted print data designated by the MFP 40.

When the interrupted print data of the user is present, the new login of this user to the MFP 40 or an increase of one's own print-permission amount 34c by this user during being logged in the MFP 40 causes the data transmitting unit 35e of the data processing device 30 to transmit data for inquiring a desire for resumption of the printing based on the interrupted print data, to the MFP 40, as illustrated in FIG. 13 (Step S261).

When the data is transmitted from the data processing device 30 at Step S261, the data reporting unit 48b of the MFP 40 displays an inquiry screen 70 (see FIG. 14) for inquiring the desire for resumption of the printing based on the interrupted print data on the display 42 (Step S262).

Figure 14:
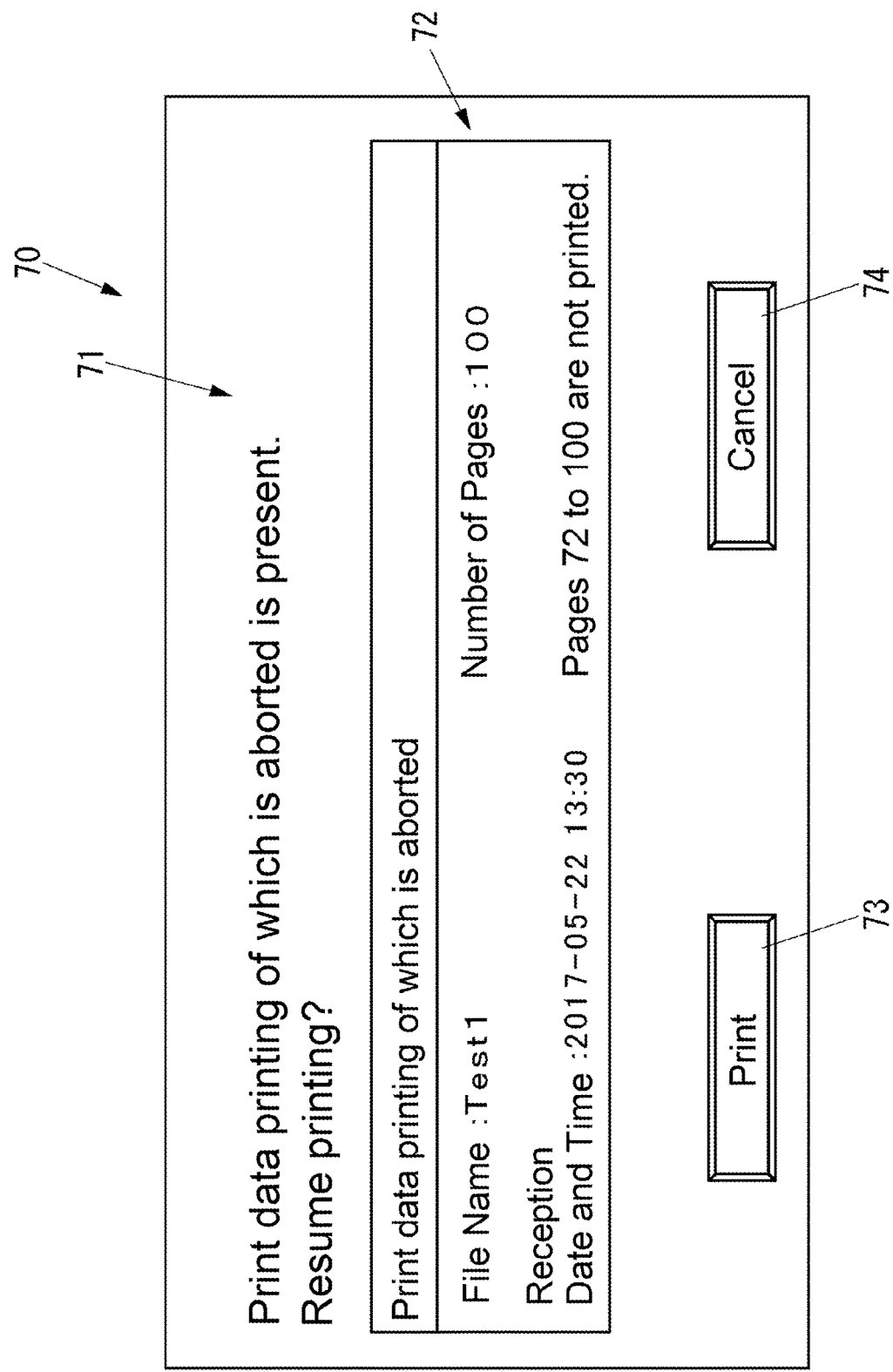
FIG. 14 shows an exemplary inquiry screen displayed in the operations illustrated in FIG. 13.

FIG. 14 shows one example of the inquiry screen 70.

As illustrated in FIG. 14, the inquiry screen 70 includes: a text 71 that indicates a message that inquires whether the printing of the interrupted print data is resumed or not; a text 72 that indicates the interrupted print data; a print button 73 for executing the printing based on the interrupted print data indicated by the text 72; and a cancel button 74 for canceling the resumption of the printing of the interrupted print data indicated by the text 72.

As illustrated in FIG. 13, after the process at Step S262, a press of the print button 73 causes the processes of Steps S263 to S270, which are similar to Steps S231 to S238 illustrated in FIG. 12, to be performed. The processes when it is determined at Step S264 that only a part of the pages among the unprinted pages in the interrupted print data are printable by the MFP 40 and the processes when it is determined at Step S264 that any page among the unprinted pages in the interrupted print data is impossible to print by the MFP 40 are also similar to the processes in the operations illustrated in FIG. 12.

In the operations illustrated in FIG. 12 and the operations illustrated in FIG. 13, the partial-data generating unit 35*f* generates the print data of only the unprinted pages in the interrupted print data, namely the unprinted-page print data. However, the partial-data generating unit 35*f* may generate the unprinted-page print data based on the interrupted print data prior to the performance of the operations illustrated in FIG. 12 and the operations illustrated in FIG. 13. For example, in the operations illustrated in FIG. 10, after it is determined at Step S202 that only a part of the pages included in the print data 34*d* are printable by the MFP 40, the partial-data generating unit 35*f* may generate the unprinted-page print data based on the interrupted print data.

Next, a description will be given of the operations of the printing system 10 when the MFP 40 performs a printing of any page in the print data.

Figure 15:
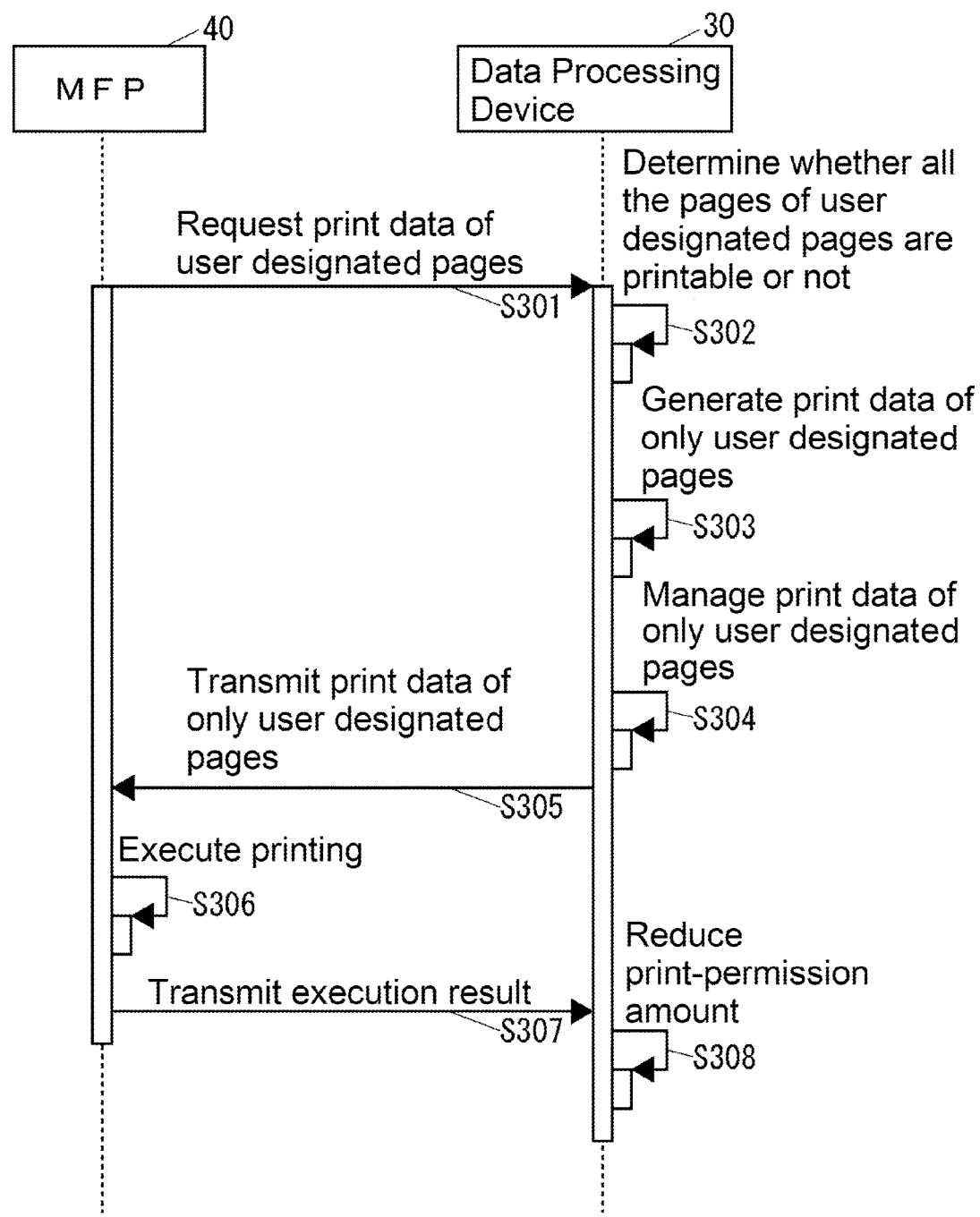
FIG. 15 shows a sequence diagram of the operations of the printing system according to the one embodiment when the MFP prints any page in the print data.

FIG. 15 shows the sequence diagram of the operations of the printing system 10 when the MFP 40 performs a printing of any page in the print data.

When the print button 53 on the list display screen 50 or the print button 65 on the thumbnail display screen 60 is operated, the printing system 10 may be able to designate the pages that the user desires to print among the pages included in the print data 34*d* indicated in the list display screen 50 or the thumbnail display screen 60 via the operation unit 41 of the MFP 40. When pages that the user desires to print are designated, as illustrated in FIG. 15, the data request unit 48*c* of the MFP 40 requests the data processing device 30 for the print data of the pages that are designated by the user (hereinafter referred to as "user-designated pages") (Step S301).

When the print data of the user-designated pages is requested from the MFP 40, the data transmitting unit 35*e* of the data processing device 30 determines whether all the pages of the user-designated pages are printable by the MFP 40 or not, based on the number of pages of the requested user-designated pages and the print-permission amount 34*c* of the user logging in the MFP 40 (Step S302).

When determined that all the pages of the user-designated pages are printable by the MFP 40 at Step S302, the partial-data generating unit 35*f* generates the print data of only the user-designated pages among the pages included in the print data 34*d* requested from the MFP 40 (Step S303).

Subsequently, the data managing unit 35*c* sets the print data generated at Step S303 as the print data 34*d* and manages by storing into the storage unit 34 by associating with the user ID associated with the print data 34*d* on which this print data is based (Step S304).

Subsequently, the data transmitting unit 35*e* transmits the print data 34*d* managed at Step S304 to the MFP 40 (Step S305).

When determining at Step S302 that any page of the user-designated pages is impossible to print by the MFP 40, the data transmitting unit 35*e* reports the MFP 40 of a fact that the print-permission amount 34*c* is insufficient. Accordingly, the data request unit 48*c* of the MFP 40 displays a fact that the print-permission amount 34*c* is insufficient, on the display 42.

When the print data 34*d* is transmitted from the data processing device 30 at Step S305, the print executing unit 48*d* of the MFP 40 performs the printing by the printer 44 based on the transmitted print data 34*d* (Step S306). The print executing unit 48*d* performs the rendering of all the pages included in the print data 34*d* for printing by the printer 44 at Step S306.

After the process at Step S306, the print executing unit 48*d* transmits the performance result of the printing at Step S306 to the data processing device 30 (Step S307).

When the performance result of the printing is transmitted from the MFP 40, the data managing unit 35*c* of the data processing device 30 reduces the print-permission amount 34*c* of the user logging in the MFP 40 based on the transmitted performance result (Step S308).

Next, a description will be given of the operations of the data processing device 30 when the print data 34*d* is deleted.

The print data 34*d* managed by the data managing unit 35*c* can be deleted at any timing. For example, the data managing unit 35*c* may delete the print data 34*d* deletion of which is instructed by the user only when deletion is instructed by the user. The data managing unit 35*c* may automatically delete this print data 34*d* at the point when the printing of all the pages included in the print data 34*d* has been performed.

Figure 16:
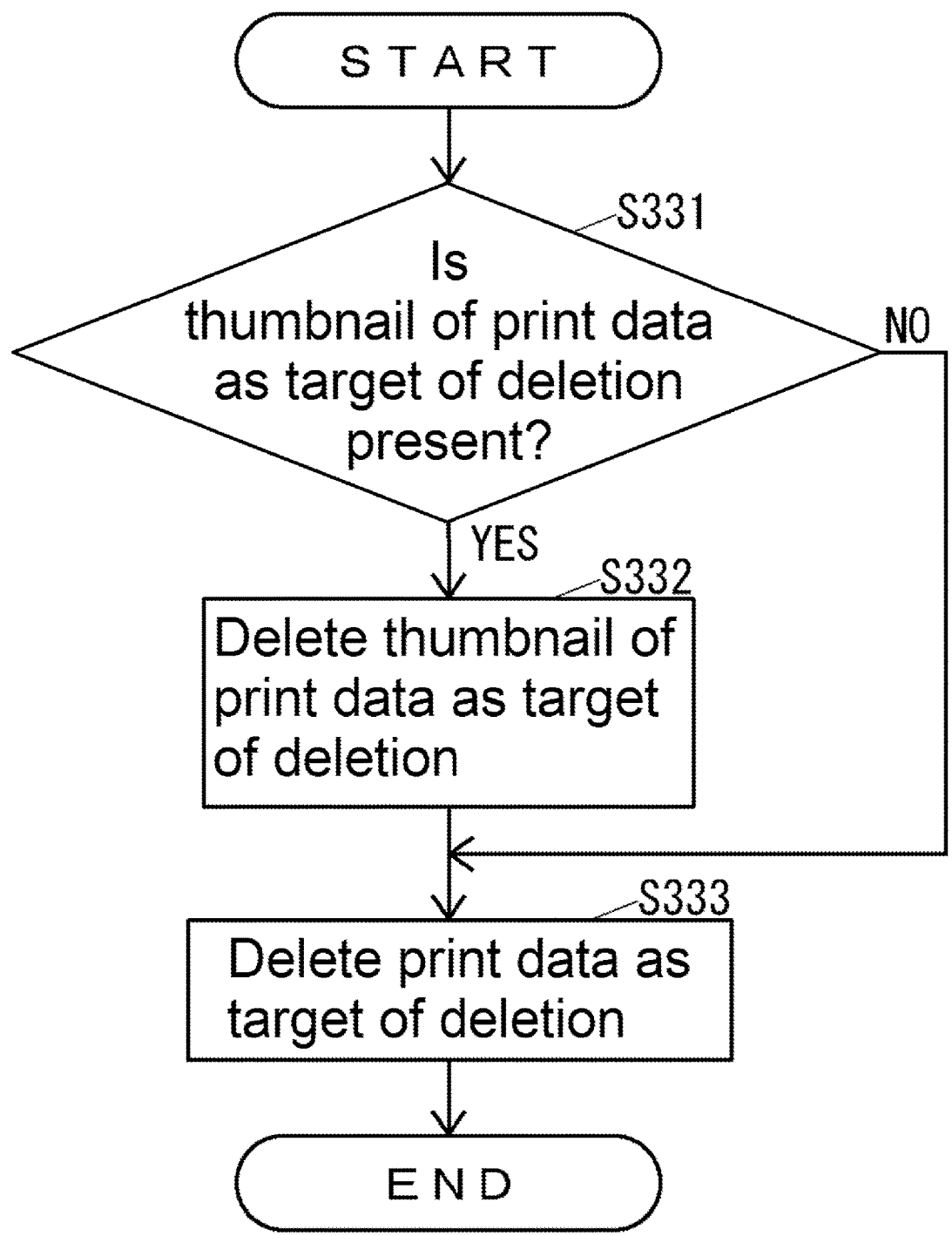
FIG. 16 illustrates a flowchart of the operations of the data processing device according to the one embodiment when deleting the print data.

FIG. 16 shows the flowchart of the operations of the data processing device 30 when the print data 34*d* is deleted.

As illustrated in FIG. 16, the data managing unit 35*c* determines whether the thumbnail 34*e* managed by being associated with the print data 34*d*, which is a target of deletion, is present or not (Step S331).

When determining that the thumbnail 34*e* managed by being associated with the print data 34*d*, which is a target of deletion, is present at Step S331, the data managing unit 35*c* deletes the thumbnail 34*e* managed by being associated with the print data 34*d*, which is a target of deletion (Step S332).

When determining that the thumbnail 34*e* is not present at Step S331 or executing the process at Step S332, the data managing unit 35*c* deletes the print data 34*d*, which is a target of deletion, (Step S333) to terminate the operations illustrated in FIG. 16.

As described above, when the MFP 40 requests the data processing device 30 for the interrupted print data (Step S231 or S263), the unprinted-page print data as the print data of the pages, the printing of which is not performed by the MFP 40 in the interrupted print data, is transmitted to the MFP 40 from the data processing device 30 (Step S235 or S267). Thus, when the MFP 40 performs a printing based on the print data and terminates the printing at a page in the middle, the printing system 10 ensures reduction of a workload that causes the MFP 40 to print the pages that are not printed by the MFP 40.

When the MFP 40 performs a printing based on the print data, even when the MFP 40 terminates the printing at the page in the middle by reaching the print-permission amount 34*c* prior to performance of printing all the pages, the printing system 10 ensures causing the MFP 40 to easily print the pages that are not printed by the MFP 40 after the print amount permitted for the user is increased.

When the MFP 40 performs a printing based on the print data, even when the MFP 40 terminates the printing at the page in the middle due to a cause other than reaching the print-permission amount 34*c*, similar to a case of terminating the printing at the page in the middle by reaching the print-permission amount 34*c*, the printing system 10 ensures causing the unprinted-page print data as the print data of the pages, the printing of which is not performed by the MFP 40, in the interrupted print data, to be transmitted to the MFP 40 from the data processing device 30.

Since the printing system 10 transmits the print data of only the pages that are printable by the MFP 40 based on the print-permission amount 34c among the plurality of pages, to the MFP 40 (Step S206), this ensures the reduced communication load between the data processing device 30 and the MFP 40 and the reduced process load in the MFP 40.

When print data of a plurality of pages is received by the data processing device 30, the printing system 10 automatically generates the thumbnails of only a part of the pages, not all the pages of the plurality of pages (Step S105). This ensures reduced decrease of performance capability for other processes by generation of the thumbnail. In particular, since the data processing device 30 sometimes simultaneously performs processes with many user terminals and processes with many MFPs, it is significantly advantageous to ensure reduced decrease of performance capability for other processes by generation of the thumbnail.

Typically, a case where a user desires to print only a part of the pages of a plurality of pages included in print data is low in a frequency of occurrence compared with a case where a user desires to print all of the pages of a plurality of pages included in print data. Then, when a user desires to print all the pages of a plurality of pages included in print data, the user often confirms the thumbnails only to identify the print data desired for printing. Thus, the user usually confirms the thumbnails of only a part of the pages, not all the pages of a plurality of pages. Therefore, typically, when many pages are included in print data, it is low necessity to generate the thumbnails of all the pages.

When the data processing device 30 has not yet managed the thumbnails of the pages requested from the MFP 40 (NO at Step S162), the data processing device 30 generates the thumbnails of the pages requested from the MFP 40 in every case (Step S164). When the data processing device 30 has already managed the thumbnails of the pages requested from the MFP 40 (YES at Step S162), the data processing device 30 does not additionally generate the thumbnails of the pages requested from the MFP 40. Therefore, the printing system 10 ensures reduced decrease of the performance capability for other processes by generation of the thumbnails.

When deleting the print data 34d (Step S333), the printing system 10 also deletes the thumbnails 34e generated based on the print data 34d (Step S332). Therefore, this ensures the reduced unnecessary use of the storage region in the storage unit 34 of the data processing device 30 due to the unnecessary thumbnails 34e.

In the printing system 10, when a printing of only a part of the pages of a plurality of pages is instructed, the MFP 40 performs the printing of only the indicated pages (Steps S236, S268 and S306). With this configuration, when a user desires to print only a part of the pages of a plurality of pages included in print data, the printing system 10 enables the user to determine the desired pages to print based on the thumbnails, and thus ensures the improved convenience.

While in the embodiment the list display screen 50 and the thumbnail display screen 60 are different screens, the list display screen 50 may also serve as the thumbnail display screen 60. That is, the list display screen 50 may display thumbnails.

While the image forming apparatus of the disclosure is the MFP in the embodiment, an image forming apparatus other than the MFP, such as a printer-only machine, is applicable.

While various aspects and embodiments have been disclosed herein, other aspects and embodiments will be apparent to those skilled in the art.

The various aspects and embodiments disclosed herein are for purposes of illustration and are not intended to be limiting, with the true scope and spirit being indicated by the following claims.

What is claimed is:

1. A network-linked printing system comprising:
an image forming apparatus; and
a computer configured to function as a printing data processing device for controlling on a per-user basis permitted printing-page ranges; the printing data processing device including
a printing-data-processing control unit, and
a printing data processing-device storage unit storing a printing data processing program, processing-device-end user authentication information, and user printing-page permission amounts, wherein the printing-data-processing control unit executing the printing data processing program realizes
a user authentication unit for authenticating users based on the processing-device-end user authentication information and on image-forming-apparatus-end user authentication information,
a data managing unit for managing printing data by associating the printing data and a corresponding user printing-page permission amount with a user authenticated by the user authentication unit, and generating a list of printing data associated with the authenticated user,
a data transmitting unit for transmitting to the image forming apparatus the printing data associated with the authenticated user, the authenticated user requesting the printing data via the image forming apparatus, and
a partial-data generating unit for generating according to the user printing-page permission amounts partial-page printing data as printing data for only a portion of pages from printing data for a plurality of pages;
the image forming apparatus including
a print executing unit for performing printing of the printing data,
an image-forming-apparatus control unit, and
an image forming apparatus storage unit storing a print program, wherein the image-forming-apparatus control unit executing the print program realizes
an authentication instruction unit for receiving user input, via an image-forming-apparatus operation unit, of the image-forming-apparatus-end user authentication information and accordingly instructing the printing data processing device for authentication of a user,
a data reporting unit for reporting on the printing data managed by the data processing device by displaying, on a display of the image forming apparatus, the list of printing data associated with the authenticated user, and reporting on printing-data print execution by the print executing unit, and
a data request unit for requesting of the data processing device user-indicated printing data in the authenticated-user-associated list of printing data reported by the data reporting unit; wherein
when the data transmitting unit receives a printing-data request from the data request unit, the data transmitting unit determines, based on the printing data's number of pages and on the authenticated user's printing-page permission amount, what portion of the printing data the image forming apparatus is permitted to print;

if the portion of the printing data the image forming apparatus is permitted to print is less than all the pages, the print executing unit interrupts printing of the printing data, leaving an unprinted portion of the interrupted printing data, and the data transmitting unit notifies the image forming apparatus that the authenticated user's printing-page permission amount is insufficient;

the data reporting unit reports on the unprinted portion of the interrupted printing data;

the partial-data generating unit generates unprinted-page printing data as the partial-page printing data, the unprinted-page printing data being those pages in the unprinted portion of the interrupted printing data whose printing is permitted by the authenticated user's printing-page permission amount;

the data transmitting unit transmits the unprinted-page printing data generated by the partial-data generating unit to the image forming apparatus when the data request unit requests the interrupted print data; and the print executing unit performs printing based on the transmitted unprinted-page printing data, wherein:

the printing-data-processing control unit executing the printing data processing program further realizes a preview image generating unit for generating printing-page thumbnails based on the print data;

the printing data processing-device storage unit is configured to store a plurality of the printing-page thumbnails, and stores initial-page-range information indicating an initial printing-page thumbnail range, the printing-page thumbnail range determining whether the preview image generating unit generates thumbnails of all or only a portion of the pages in the printing data; and the printing data processing device is further configured for controlling on a per-user basis the printing-page thumbnail range.

2. The printing system according to claim 1, wherein the printing-page thumbnail range is changeable in response to a corresponding instruction entered either via the image-forming-apparatus operation unit or via a network-linked external input means.

3. The printing system according to claim 1, further comprising, networked linked to the system, an external computer whereby the authenticated user's printing-page permission amount is increasable.

* * * * *